(12) United States Patent
Zimmerman

(10) Patent No.: US 7,451,470 B2
(45) Date of Patent: Nov. 11, 2008

(54) TV PROGRAM PROFILING TECHNIQUE AND INTERFACE

(75) Inventor: John Zimmerman, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 928 days.

(21) Appl. No.: 09/821,060

(22) Filed: Mar. 29, 2001

(65) Prior Publication Data

US 2002/0140728 A1   Oct. 3, 2002

(51) Int. Cl.
*H04N 5/445* (2006.01)
*G06F 3/00* (2006.01)
*G06F 13/00* (2006.01)

(52) U.S. Cl. .............................. 725/46; 725/47; 725/52

(58) Field of Classification Search ................ 715/833, 715/856, 700, 789; 725/46, 37; 345/440.2
See application file for complete search history.

(56) References Cited

U.S. PATENT DOCUMENTS

| | | | | |
|---|---|---|---|---|
| 5,410,344 A | * | 4/1995 | Graves et al. ................. 725/46 |
| 5,444,499 A | * | 8/1995 | Saitoh ........................ 348/734 |
| 5,754,939 A | * | 5/1998 | Herz et al. .................. 455/3.04 |
| 5,758,259 A | | 5/1998 | Lawler |
| 5,983,220 A | * | 11/1999 | Schmitt ........................ 707/5 |
| 6,005,597 A | * | 12/1999 | Barrett et al. ................. 725/46 |
| 6,020,883 A | | 2/2000 | Herz et al. |
| 6,025,869 A | * | 2/2000 | Stas et al. ..................... 725/28 |
| 6,177,931 B1 | * | 1/2001 | Alexander et al. ............ 725/52 |
| 6,271,863 B1 | * | 8/2001 | Bose et al. ................... 345/440 |
| 6,446,261 B1 | * | 9/2002 | Rosser ........................ 725/34 |
| 6,614,456 B1 | * | 9/2003 | Rzepkowski et al. ........ 715/833 |
| 2002/0129368 A1 | * | 9/2002 | Schlack et al. ............... 725/46 |

FOREIGN PATENT DOCUMENTS

| | | |
|---|---|---|
| EP | 0854645 A2 | 7/1998 |
| WO | WO0007310 | 2/2000 |

* cited by examiner

*Primary Examiner*—John W. Miller
*Assistant Examiner*—Dominic Saltarelli

(57) ABSTRACT

A new, interactive, television program profile interface and method are described. The interface is used to capture and display the likes and dislikes of a television viewer in multi-axis format. The weighting of the viewer's preferences proportionately changes over time. Those preferences are illustrated in bar graph format with respect to time or other axes. The viewer interacts with the graphical representations by time traversing the preferential chart, and providing necessary modifications and updates.

21 Claims, 4 Drawing Sheets

TV PROGRAM PROFILING TECHNIQUE AND INTERFACE

FIELD OF THE INVENTION

The invention relates to methods of profiling television viewer preferences and habits and, more particularly, to an interactive, graphical profiling interface representing preferences of a television viewer with respect to a time axis.

BACKGROUND OF THE INVENTION

The profiling of television viewer preferences is well established in the art. Television networks are particularly interested in viewer likes and dislikes in order to schedule and create the shows that people will want to watch. Advertisers and rating organizations are also among the media forces that drive the television industry.

More recently, manufactures of consumer television electronics and products have also become involved in profiling viewer preferences, in order to provide purchasers with the ability to program their tape and VCR machines easily. It is also necessary to provide friendly, personalized user features, in order to make such electronic products more appealing to buyers.

It has been discovered that merely observing a particular viewer profile of programs that have been selected over a given time period will not always provide the profiler with accurate information. This is because it has been observed that viewers' preferences change with the time of day. For example, a person who turns on his or her television in the morning may be most interested in watching the weather channel, in order to dress appropriately for his or her commute to work. However, the same individual may watch the weather channel in order to obtain tomorrow's forecast and watch a sitcom in the evening. The fact that the viewer watched more weather programs than sitcom programs would not accurately reflect the overall viewer preference.

It has also been observed that viewers having a profile that indicates they watch more sitcoms than operas, for example, may actually prefer operas to sitcoms. There are simply more sitcoms available for television viewing than there are operas.

It would be advantageous therefore, to implement a method of profiling viewer preferences, wherein the viewer can provide his or her input to observed viewing data. Obtaining viewer inputs, however, is fraught with difficulties. Some individuals do not want to be bothered with having to provide survey-type information with respect to their likes and dislikes. Other individuals are more than willing to provide such information, but are confused with graphical representations of their observed behavior.

The present invention seeks to provide a new graphics interface in obtaining viewer preferences. The new graphic interface is based on a time profile of viewer likes and dislikes, wherein heavily weighted preferences proportionally change with the time of day.

In addition, the current invention seeks to graphically represent viewer preferences in bar graph form, since it has been determined that most viewers can more easily identify with, and understand, this type of graphical representation.

DISCUSSION OF THE RELATED ART

U.S. Pat. No. 5,758,259 shows a method for identifying a preferred television program based on a "correlation" between the program and predetermined characteristics of a user profile. The term "correlation" as used in the patent does not appear to relate to the mathematical concept of correlation, but rather is a very simple algorithm for assessing some similarity between a profile and a program.

In U.S. Pat. No. 5,410,344, a method and apparatus is illustrated for selecting programs for presentation to a viewer. The information of viewer preference is shown in bar graph form. However, unlike the present invention, the bar graph does not represent the viewer's profile with respect to time, but rather illustrates only the previously watched show, wherein the viewer can make changes to this rating. In contrast, the current invention allows the viewer to observe his or her total viewing content over time. In addition, the present invention allows the viewer to interact with the displayed preferences at any particular time of day, by merely traveling down the time access of the new graphical interface.

U.S. Pat. No. 6,020,883 depicts viewer profile information that can be tracked over time. This method, however, is different from the present inventive technique, in that the ratings do not change proportionately with respect to time. In addition, this patent does not offer any information with respect to the graphical interface that may be used to represent the weighting of the viewer preferences.

SUMMARY OF THE INVENTION

The present invention features a new method for television viewer profiling. The new method introduces an interactive, graphical representation in the form of easily understandable and identifiable viewer preferences. The graphical representation depicts weighted bar graphs, showing heavy and light usage of particular television formats, such as action, comedy, drama, etc. In other words, the weighting is not based upon any particular show, but rather upon a show style or program type preference. In addition, the graphical representation is weighted with respect to time. The weighting of a particular preference will change proportionately, as the time axis of the graph is traversed from morning to evening, or beyond. The graphical representation of the preferences of the viewer is modifiable by the viewer, so that the program formats can more accurately reflect the true likes and dislikes of that individual.

It is an object of the invention to provide an improved technique for obtaining a television viewer profile of his or her viewing preferences.

It is a further object of this invention to provide a multiple axis representation of television viewer preferences.

Further objects and advantages of the invention will be better understood, and will become more apparent, with reference to the subsequent detailed description in the preferred embodiment, taken in conjunction with reference to the following drawings.

BRIEF DESCRIPTION OF THE DRAWING

The invention will now be described by way of non-limiting examples considered in conjunction with the following drawings.

DETAILED DESCRIPTION OF THE PREFERRED EMBODIMENT

Generally speaking, the invention features a more easily understandable and more accurately depicted television program profiling interface and method. The interface comprises the likes and dislikes of a television viewer in multi-axis format. The weighting of the viewer's preferences proportionately changes over time; these preferences are illustrated in bar graph format with respect to time. The viewer interacts with the graphical representations by time traversing the preferential chart, and providing necessary modifications and updates.

Figure 1:
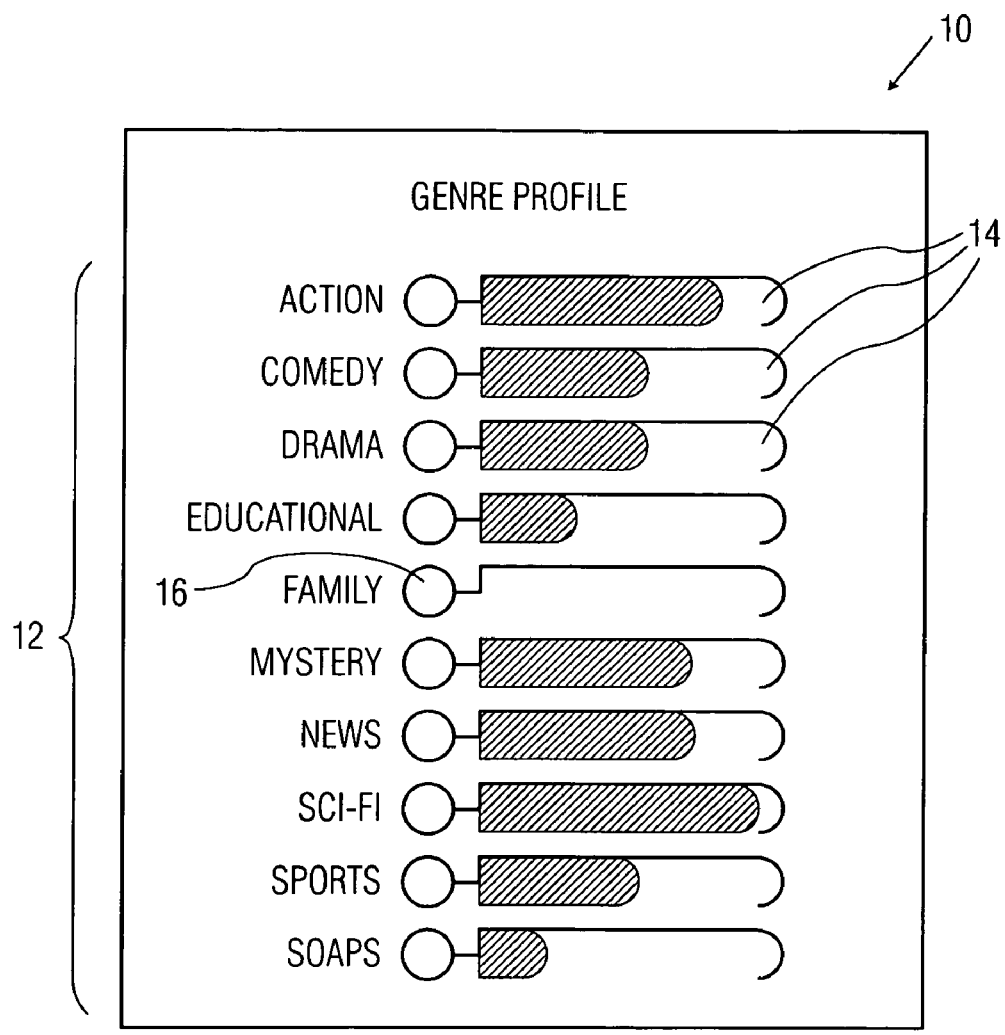
FIG. 1 shows a graphical interface representing a typical television viewer profile containing preferred viewer program participation data, in accordance with the present invention.

Now referring to FIG. 1, a graphical representation of a typical television viewer profile interface 10 is illustrated. The profile comprises a set 12 of various program appetites, presented in a gestalt view. The programs of set 12 include, but are not limited to, action programs, comedy, drama, educational programs, family programs, mystery programs, news, science fiction (Sci-Fi), sports, soaps, sitcoms, weather, etc. Each program of the set 12 is represented by a weighted television viewer preference, by way of the varying lengths of the adjacent bar graphs 14, as illustrated. The longer the length of the bar graph 14, the greater the weight given to that type or style of program.

The preference weight is directly related to data obtained by observing the particular individual's viewing habits over the course of a given period of time (say, for example, one month of television viewing). The bar graph may relate to the time spent watching that particular type of program, or it may be related to the number of such programs that were selected and viewed over the course of the observed viewing period. The data would typically be stored in a viewer database and computer processed to convert the raw data into graphical form. The observed data is recorded under the aegis of a computer program, common in this art.

In the typical interface 10 illustrated herein, it will be observed that those program types that are not viewed will have no associated bar graph representation, as shown by way of example, that of the family programs.

In the method of this invention, the individual viewer would observe the data presented by interface 10. He or she would easily identify and understand that the action programs and the Sci-Fi programs were those that were most actively watched, by virtue of the greater extended length of the bar graph. Should the viewer then disagree with the findings of the data-gathering computer program, or otherwise desire to reprogram or modify the profile to better reflect his or her individual choices in viewing, he or she could change the profile by way of a mouse, stencil, or touch pad, etc. This would include the elimination or the addition of program categories (e.g., cartoons). This could be done by clicking on the associated circle 16 to activate or deactivate that particular program category. To lengthen or shorten the bar graph 14, the user could use the mouse or touch pad to extend or shorten the bar. Although the particular interface 10 does not depict any scale for bar graph length, this can be requested or eliminated from the interface 10 by clicking on the words "Genre Profile", located at the top of the screen.

Figure 2:
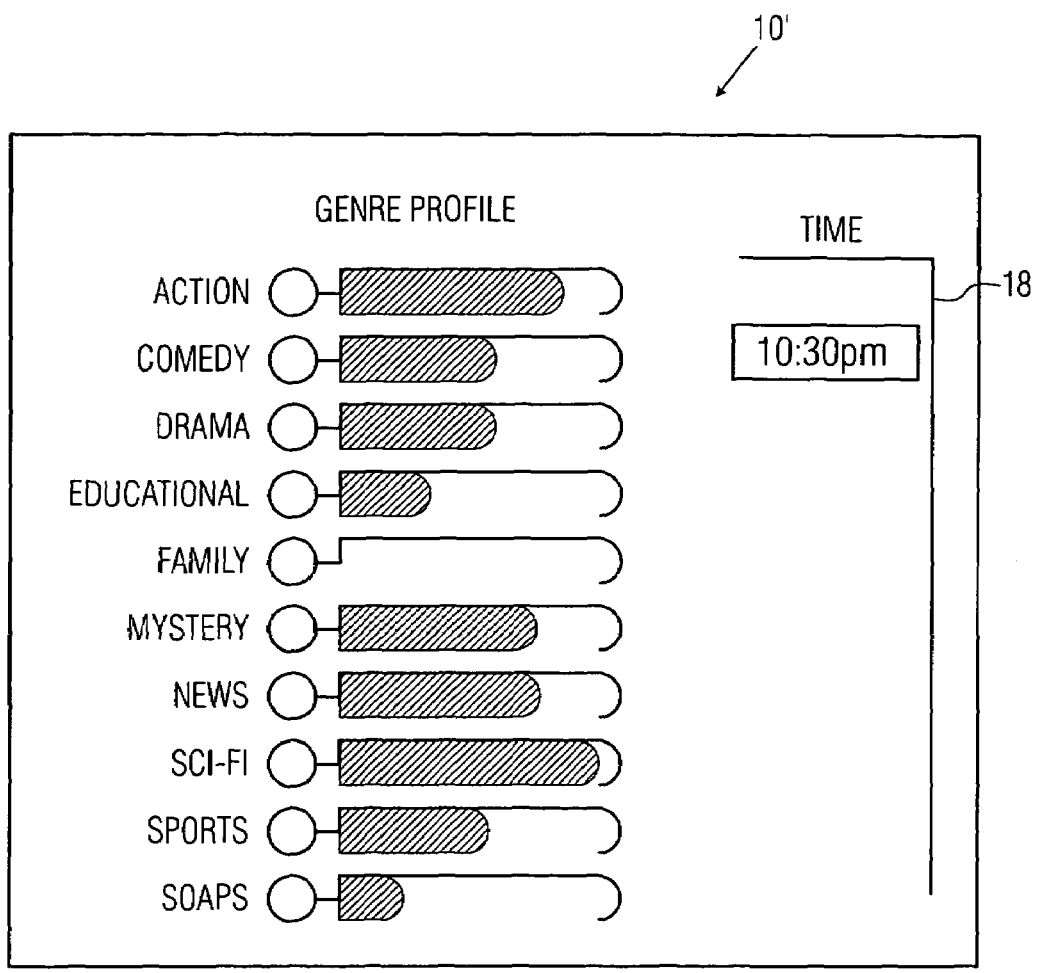
FIG. 2 illustrates the graphical interface depicted in FIG. 1, having a multiple axis format with respect to time.

Referring to FIG. 2, the interface 10' is similar to the interface 10, shown in FIG. 1, with the difference that the "Genre Profile" changes proportionately with time. That is to say, each program category, such as action, comedy, drama, etc., will change its bar graph length with respect to an axis 18, proportionally. The particular time exhibited in the interface 10' is changeable by dragging a cursor upwardly or downwardly along the time axis 18. The particular day of the week or any other parameter, not shown here, can be accessed, changed, or modified, by clicking upon the word "date" for example, or "time", that can be shown upon the screen.

In making changes or modifications to any graph, bar length, or time, the computer program relating to the interface 10 or 10' can allow for consequential or resulting changes to be made to associated information, such as other programs, times, dates, etc. The program can also be designed to freeze adjacent data, when such changes are made or contemplated by the viewer.

It should also be recognized that the layout or particular orientation of the graphs or axes of the interfaces 10 and 10', respectively, are merely suggestive. Such orientation, obviously can be viewable either horizontally or vertically. The orientation can be subject to change according to user preference. In this regard, the interfaces of this invention can be preceded by a menu, requesting the viewer to choose a particular orientation or other user preference that relates to the particular way the interface is to be viewed or presented.

Figure 3:
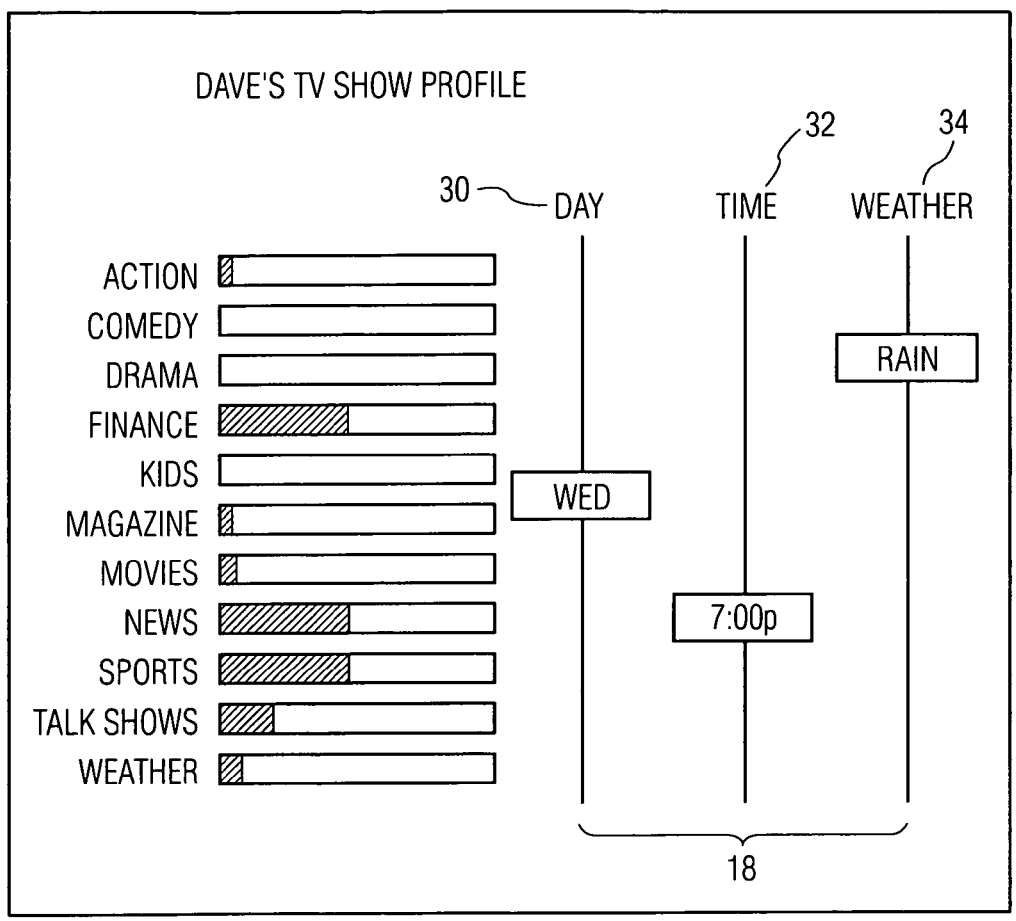
FIG. 3 is a bar graph of a customized profile with a number of axes in accordance with the present invention.

The interfaces 10 and 10' of this invention are meant to reflect that profiles can be represented by a multiplicity of axes 18, as indicated by the custom bar graph created for the viewer, Dave, shown in FIG. 3. Examples of other axes 18 so desired, suggested, or contemplated, include day 30, time 32, weather 34, month, season, year, mood, user task (sleeping, eating, driving, household chores such as ironing, washing clothes, etc.), user location (home, car, office, kitchen, bedroom, etc.), time of year (winter, spring, fall, summer), and the presence or absence of other people. As a definition of "multiplicity", the axes 18 can be represented singularly with respect to the preference profile, or in multiple oriented axes profile, as can be fitted into, and upon, a scalar, cartesian, three-dimensional, four-dimensional, etc., setting.

The computer program or menu controlling the interface presentation, axes, or viewable setting can be chosen by each user according to his or her individual likes and dislikes. Items, axes, profiles, orientation, etc., can be chosen by menu.

Some users may also prefer seeing data in the form of a pie or other graphical representation other than a bar graph. Some users may also prefer to see their profiles represented by more than one graph (i.e., bar graph, pie graph, data table and/or curve, etc.).

Figure 4:
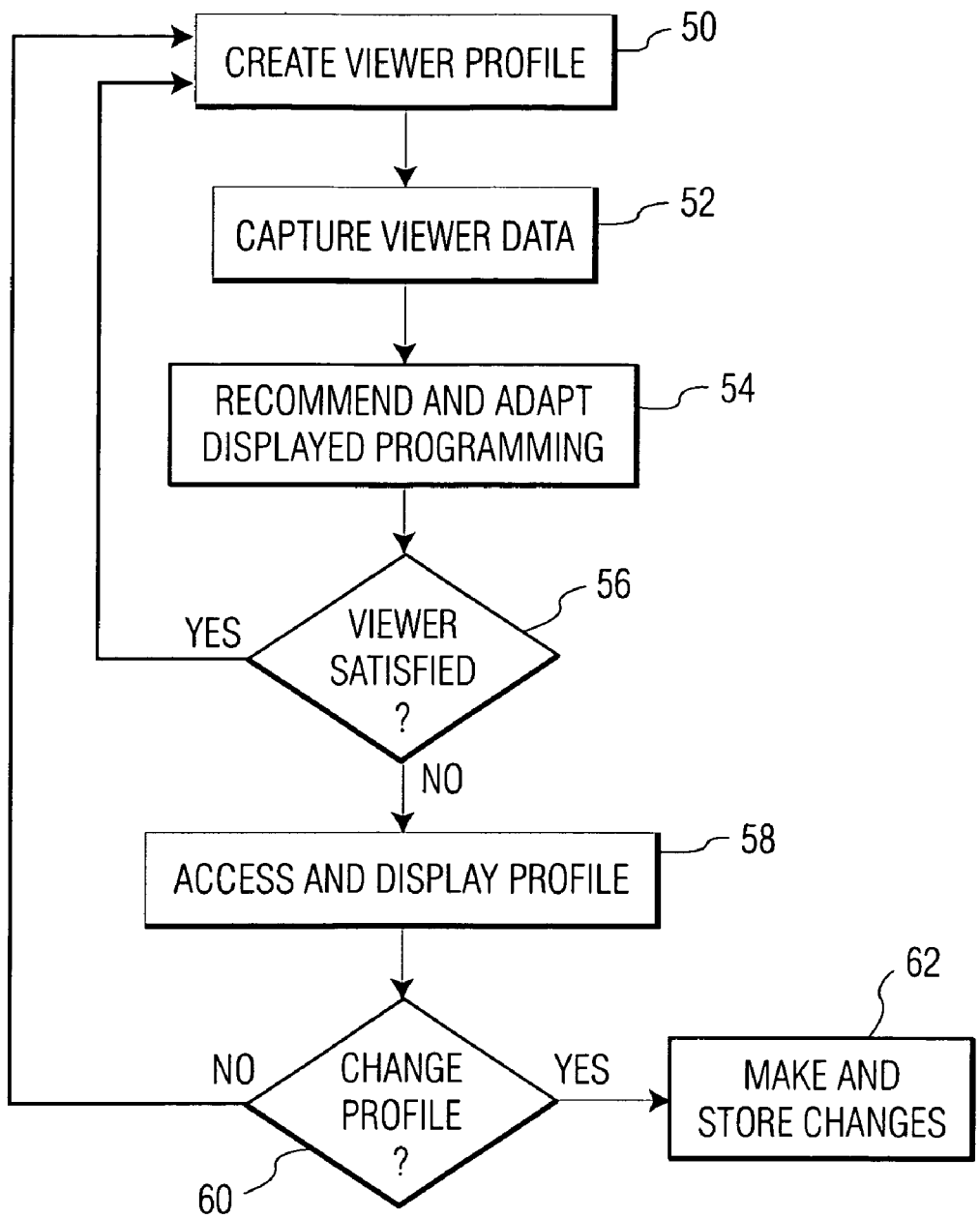
FIG. 4 is a flow chart of operations for a viewer or user to create a profile and modify it, if desired.

Referring now to FIG. 4, there is shown a flow chart that indicates how a user or viewer profile is created, modified and used. The user or viewer is first requested to provide certain personal information into the computer system, step 50. Once the personal information is provided, a profile is created. The system then operates to capture data relating to the viewing habits of the viewer, step 52. Once again, the system keeps track not only of the television programs viewed by the viewer, but other parameters such as but not including the time of day, the day of the week, the user task, user mood, etc.

As the viewer data is received by the system, the system itself can begin to recommend programming, step 54, even if such programming has not been previously viewed by the viewer. The system automatically adapts itself based on such viewer data. Such adaptation can occur periodically or only when new data is provided to the system.

If a recommendation is made to the viewer and the viewer is satisfied with such recommendation, step 56, the system continues to accept new viewer data, step 52. If, however, the viewer is not satisfied with the recommendation or recommendations of the system, step 56, he or she may access the profile, step 58, in one or more formats. For example, with reference to FIG. 3, the viewer may adjust his or her profile by moving the elements along axes 18 to see more detailed information stored in his or her profile. The user can also adjust the bars in such axes 18 to refine how the system interacts with the information provided during the viewer data capture. Thus, if the viewer decides to change his or her profile, step 60, such changes can be made and stored in the system, step 62, graphically or alphanumerically, depending upon the input device of the user. Of course, if the profile need not be changed, step 60, the system automatically resumes capturing view data, step 52.

In this way, it can be seen that a user may accept or reject recommendations made by the system, based on the user's viewer data captured by the system and the user's profile provided both by the user and the system. The profile itself can be modified to reflect the user's preferences when the user disagrees with certain recommendations made by the system.

Since other modifications and changes varied to fit particular operating requirements and environments will be, or otherwise become, apparent to those skilled in the art, this invention is not considered limited to the examples presented herein for the purposes of disclosure, but rather it is deemed to include all changes and modifications that do not constitute departures from the true spirit and scope of this invention.

Having described what is considered an exemplary form of this invention, what is desired to be protected by Letters Patent, is hereafter presented by the subsequently appended claims.

What is claimed is:

1. A television apparatus having a display on which is generated a television program profile interface, said television program profile interface having a multiplicity of axes, including:
   a television viewer profile represented by weighted viewer preferences, different portions of which are selectable by traversing along at least one axis of the multiplicity of axes,
   wherein the weighted viewer preferences are represented along a plurality of axes that are different than the at least one axis of the multiplicity of axes,
   wherein the at least one axis of the multiplicity of axes are provided within a same view as the television viewer profile and represents at least one activity not involved in viewing or listening to television,
   wherein the at least one of the multiplicity of axes has an altering mechanism allowing a value associated with a position on the at least one axis to be changed along the at least one axis,
   wherein the television viewer profile weighted viewer preferences have an activation mechanism that allows for viewer selection and manipulation of the television viewer profile weighted viewer preferences.

2. A television apparatus having a display on which is generated a television program profile interface, said television program profile interface having a multiplicity of axes, including:
   a television viewer profile represented by weighted viewer preferences, different portions of which are selectable by traversing along at least one axis of the multiplicity of axes,
   wherein the weighted viewer preferences are represented along a plurality of axes that are different than the at least one axis of the multiplicity of axes,
   wherein the at least one axis of the multiplicity of axes are provided within a same view as the television viewer profile,
   wherein the at least one of the multiplicity of axes has an altering mechanism allowing a value associated with a position on the at least one axis to be changed along the at least one axis,
   wherein the television viewer profile weighted viewer preferences have an activation mechanism that allows for viewer selection and manipulation of the television viewer profile weighted viewer preferences,
   wherein the at least one axis comprises time.

3. The television apparatus as claimed in claim 1, wherein said weighted viewer preferences are represented by bar graphs.

4. The television apparatus as claimed in claim 2, wherein said weighted viewer preferences are represented by bar graphs.

5. The television apparatus as claimed in claim 1, wherein each of said weighted viewer preferences is individually viewer modifiable.

6. The television apparatus as claimed in claim 1, further comprising means for viewer interaction to alter a topic selection presented by the television viewer profile to provide said weighted viewer preferences sorted by a selected topic represented on the at least one axis.

7. A method of displaying a television viewer profile represented by weighted viewer preferences, said method including the steps of:
   a) displaying a television viewer profile that presents a list of weighted viewer preferences that change proportionally with respect to at least one axis of a multiplicity of axes,
      wherein the weighted viewer preferences are represented along a plurality of axes that are different than the at least one axis of the multiplicity of axes,
      wherein the at least one axis of the multiplicity of axes are provided within a same view as the television viewer profile; and
   b) modifying said television viewer profile via an access mechanism that allows a viewer accessing different portions of the television viewer profile by traversing along the at least one axis,
      wherein the at least one of the multiplicity of axes is at least two of the multiplicity of axes.

8. The television apparatus as claimed in claim 1 wherein the activation mechanism is configured to allow viewer manipulation of selected weighted viewer preferences by moving the selected weighted viewer preferences along an axis.

9. A television apparatus having a display on which is generated a television program profile interface, said television program profile interface having a multiplicity of axes, including:
   a television viewer profile represented by weighted viewer preferences, different portions of which are selectable by traversing along at least one axis of the multiplicity of axes,
   wherein the weighted viewer preferences are represented along a plurality of axes that are different than the at least one axis of the multiplicity of axes,
   wherein the at least one axis of the multiplicity of axes are provided within a same view as the television viewer profile,
   wherein the at least one of the multiplicity of axes has an altering mechanism allowing a value associated with a position on the at least one axis to be changed along the at least one axis,
   wherein the television viewer profile weighted viewer preferences have an activation mechanism that allows for viewer selection and manipulation of the television viewer profile weighted viewer preferences,
   wherein the at least one of the multiplicity of axes is at least two of the multiplicity of axes.

10. The television apparatus as claimed in claim 9, wherein the at least two of the multiplicity of axes are arranged in parallel to each other.

11. A television apparatus having a display on which is generated a television program profile interface, said television program profile interface having a multiplicity of axes, comprising a television viewer profile represented by weighted viewer preferences that changes with respect to at least one axis of the multiplicity of axes, wherein the weighted viewer preferences are represented along a plurality of axes that are different than the at least one axis of the multiplicity of axes, wherein the at least one axis of the multiplicity of axes are provided within a same view as the television viewer profile, wherein the at least one of the multiplicity of axes has an altering mechanism allowing a value associated with a position on the at least one axis to be changed along the at least one axis, wherein a selection of the position along the at least one axis of the multiplicity of axes operates to filter the weighted viewer preferences to provide weighted viewer preferences that correspond to the selected position, and wherein the at least one of the multiplicity of axes is at least two of the multiplicity of axes.

12. A television apparatus having a display on which is generated a television program profile interface, said television program profile interface having a multiplicity of axes, comprising a television viewer profile represented by weighted viewer preferences that changes with respect to at least one axis of the multiplicity of axes, wherein the weighted viewer preferences are represented along a plurality of axes that are different than the at least one axis of the multiplicity of axes, wherein the at least one axis of the multiplicity of axes are provided within a same view as the television viewer profile, wherein the at least one of the multiplicity of axes has an altering mechanism allowing a value associated with a position on the at least one axis to be changed along the at least one axis, wherein a selection of the position along the at least one axis of the multiplicity of axes operates to filter the weighted viewer preferences to provide weighted viewer preferences that correspond to the selected position, and wherein the at least one of the multiplicity of axes is least two of the multiplicity of axes.

13. The television apparatus as claimed in claim 12, wherein the at least two of the multiplicity of axes are arranged in parallel to each other.

14. A television apparatus having a display on which is generated a television program profile interface, said television program profile interface having a multiplicity of axes, including:

a television viewer profile represented by weighted viewer preferences that proportionately change with respect to at least one axis of the multiplicity of axes, wherein the at least one of the multiplicity of axes has a profile view selecting mechanism that selects the profile view by traversing along the at least one axis, wherein at least one of the multiplicity of axes represents at least one activity not involved in viewing or listening to television and the television viewer profile weighted viewer preferences have an activation mechanism that allows for viewer selection and manipulation of the television viewer profile weighted viewer preferences.

15. A television apparatus having a display on which is generated a television program profile interface, said television program profile interface having a multiplicity of axes, including:

a television viewer profile represented by weighted viewer preferences that proportionately change with respect to at least one axis of the multiplicity of axes, wherein the at least one of the multiplicity of axes has a profile view selecting mechanism that selects the profile view by traversing along the at least one axis, wherein at least one of the multiplicity of axes represents at least one activity not involved in viewing television and the television viewer profile weighted viewer preferences have an activation mechanism that allows for viewer selection and manipulation of the television viewer profile weighted viewer preferences, wherein the at least one axis comprises time.

16. The television apparatus as claimed in claim 14, further comprising means for viewer interaction to alter a topic selection presented by the television viewer profile to provide said weighted viewer preferences sorted by a selected topic.

17. A television apparatus having a display on which is generated an interactive, television program profile interface, said interactive, television program profile interface, including:

television viewer profile represented by weighted viewer preferences in graphical form including a plurality of bar graphs, wherein the bar graphs change with respect to at least one axis of a multiplicity of axes, and wherein the at least one axis has a profile view selecting mechanism that selects the profile view without altering the television viewer profile by traversing along the at least one axis, said bar graphs being coupled to an access mechanism that allows for viewer selection and altering of weighted viewer preferences, wherein the at least one of the multiplicity of axes is at least two of the multiplicity of axes.

18. The television apparatus claimed in claim 17, wherein at least one of the multiplicity of axes represents at least one activity not related to viewing television.

19. A method of displaying a television viewer profile represented by weighted viewer preferences, said method including the steps of:

a) displaying a television viewer profile that presents weighted viewer preferences along an axis, said weighted viewer preferences changing proportionally with respect to at least one axis of the multiplicity of axes, wherein the at least one of the multiplicity of axes has a profile view selecting mechanism that selects the profile view without altering the television viewer profile by traversing along the at least one axis, wherein at least one of the multiplicity of axes represents an at least one activity not involved in viewing television; and b) modifying said television viewer profile by viewer interaction via an access mechanism that allows viewer selection and alteration of the television viewer profile by traversing along said axis, wherein the at least one of the multiplicity of axes is at least two of the multiplicity of axes.

20. The method as claimed in claim 19, wherein the act of modifying said television viewer profile view further comprises the access mechanism providing a selection device that allows selection from one of a plurality of weighted viewer preferences within the television viewer profile.

21. The method as claimed in claim 20, wherein the act of modifying said television viewer profile view further comprises the access mechanism providing an altering device that allows altering of a selected one of the plurality of weighted viewer preferences within the television viewer profile.

* * * * *